Dec. 2, 1952 J. B. SHICKEL 2,620,405

MAGNETIC RECORDER

Filed March 28, 1950 2 SHEETS—SHEET 1

Inventor:
James B. Shickel,
by Merton D. Moore
His Attorney.

Inventor:
James B. Shickel,
by Merton D. Morse
His Attorney.

Patented Dec. 2, 1952

2,620,405

UNITED STATES PATENT OFFICE 2,620,405

MAGNETIC RECORDER

James B. Shickel, Baldwinsville, N. Y., assignor to General Electric Company, a corporation of New York Application March 28, 1950, Serial No. 152,393

11 Claims. (Cl. 179—100.2)

This invention relates to a magnetic recorder and, more particularly, to an electromagnetic instrument for recording signals on a paramagnetic wire or tape and reproducing the signals therefrom.

Magnetic recording and playback systems are finding increasing application in the fields of mass advertising and industrial and public safety control, etc. This is chiefly attributable to the ease with which messages can be recorded, erased and edited. The equipment itself usually is more rugged, compact, simple and less expensive than other types of recording equipment. The magnetic recording and reproducing equipment usually comprises a paramagnetic wire or tape, sometimes arranged into a closed loop and driven by means of a motor into magnetic coupling with a recording or reproducing head. For reasons of simplicity and cost, a common head may be employed for recording and playback. This means a switching arrangement must be provided to insert the magnetic head at the input of an amplifier driving a speaker when playing back the message recorded on the recording medium, and to switch the magnetic head to the output of an amplifier when a message is to be recorded on the recording medium. Also, it is often times desirable to control the operation of erasing circuits, bias circuits for the magnetic head when in recording position, the insertion of a microphone at the input of the amplifier when recording, etc., concurrently with the switching of the magnetic head. Thus, a demand exists for a switching arrangement capable of performing all these functions which is simple, inexpensive and reliable.

It is an object of my invention to provide a novel apparatus for magnetic recording and reproduction.

Another object of my invention is to provide a novel recording and reproducing system employing a minimum of components.

A still further object of my invention is to provide novel means for converting an apparatus from a magnetic recording position to a magnetic playback position.

A further object of my invention is to control operation of the major electrical circuit with detachable adaptor units for recording or playback purposes.

Figure 1:
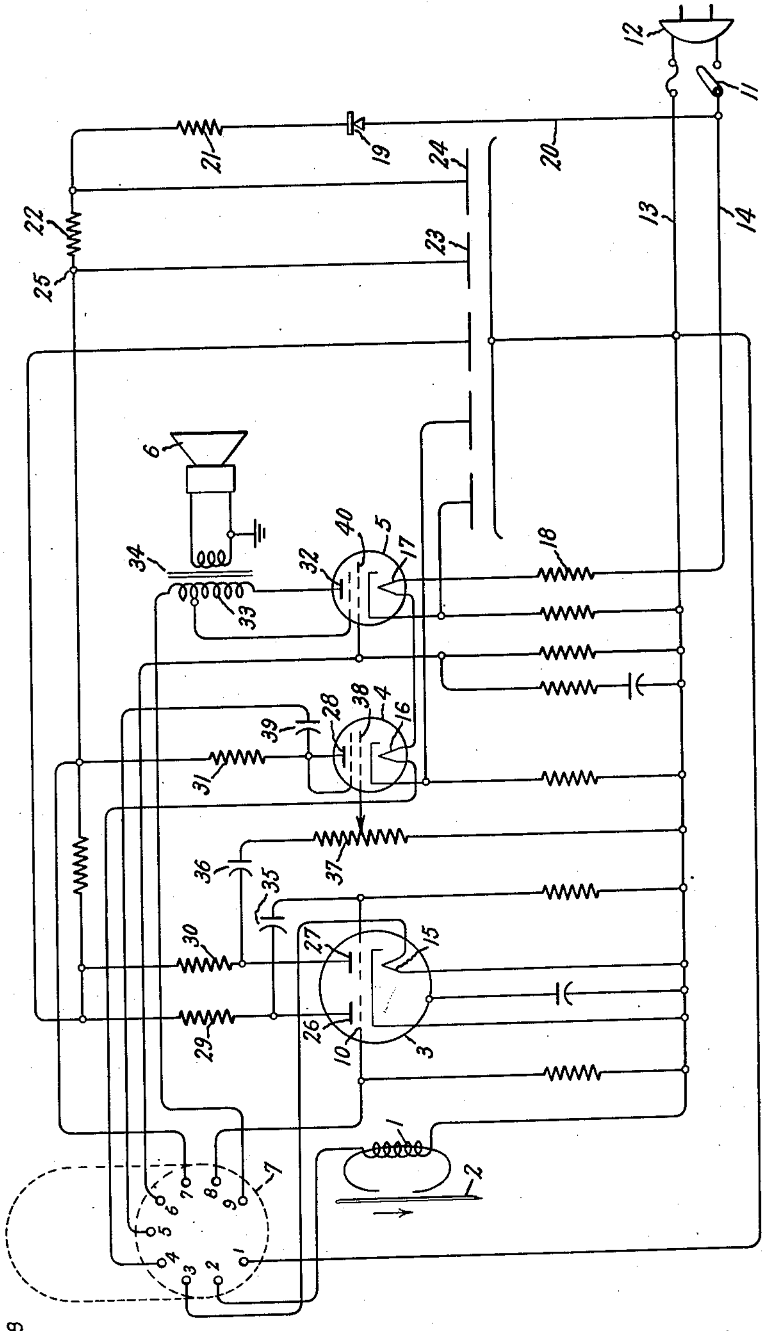
Figure 1A:
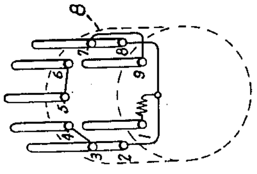
Figure 2A:
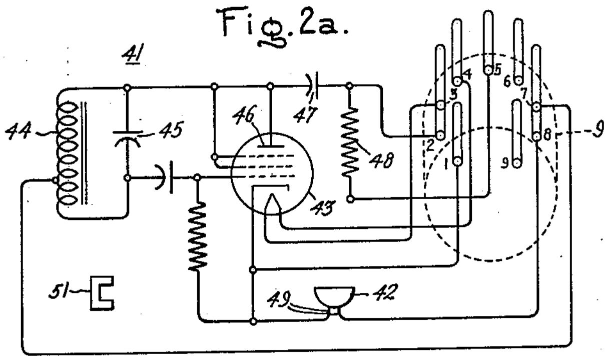

The novel features which I believe characteristic of my invention are set forth with particularity in the appended claims. My invention, however, both as to its organization and method of operation, together with further objects and advantages thereof, may best be understood by reference to the following description taken in connection with the accompanying drawings, wherein Fig. 1 is a circuit diagram of the basic component of a magnetic transducing arrangement; Fig. 1*a* illustrates schematically a playback adaptor for cooperation with the circuit of Fig. 1; Fig. 2 is a circuit diagram of a recording adaptor for cooperation with the circuit of Fig. 1; and Fig. 2*a* illustrates schematically the physical nature of the recording adaptor.

Referring to Fig. 1, there is disclosed a magnetic recording or reproducing head 1, shown as a coil and laminations, operating in conjunction with a recording medium such as a paramagnetic wire, or the tape 2. The tape is preferably arranged in the form of a closed loop. The tape 2 is moved past the magnetic head in the direction of the arrow by a driving source, such as a motor, not shown. Since the tape is magnetically linked with the head 1, it either stores the electrical signals available in the head, or transmits the stored signals to the head. Electron discharge devices 3, 4 and 5 operate as an amplifying unit for operating the loudspeaker 6 in accordance with the output of the magnetic head 1 when it is employed for reproduction purposes.

Various connections are made from the circuit of Fig. 1 to a socket 7. The playback plug 8, as shown in Fig. 1*a*, completes the various circuits of the arrangement shown in Fig. 1 when it is to be used for reproduction. A recording plug 9 is provided for plugging into the socket 7 when the arrangement is to be employed for recording. The functioning of the socket and plugs will be explained in more detail later.

When the arrangement of Fig. 1 is operating as a reproducer, that is, when the plug 8 is meshed with the socket 7, the output of head 1 is coupled by the jumper interconnecting pins 2 and 8 of plug 8 to the control grid 10 of the left hand triode portion of device 3.

Closing of switch 11 applies an alternating voltage available from outlet plug 12 between buses 13 and 14. Filaments 15, 16 and 17 of devices 3, 4, 5 are energized in series from the buses 13 and 14 by means of the jumper connecting pins 3 and 4 of plug 8. In a preferred embodiment, devices 3, 4 and 5 are a 12SC7, a 35L6 and 50L6 type tube respectively. Resistor 18 in the filament lead of device 5 limits the current in the series filament connection to the proper level. Plate potential for devices 3, 4 and 5 is derived by connecting rectifier 19 to bus 14 by means of lead 20 and by resistor 21 and the filter circuit comprising resistor 22 and condensers 23 and 24 to the bus 13. The filtered unidirectional potential available at point 25 is then applied to the anodes 26, 27 and 28 of devices 3 and 4 by means of the load resistors 29, 30 and 31 and to the anode 32 of device 5 by the jumper connecting pins 7 and 9 of plug 8 and the primary winding 33 of transformer 34. The output of the magnetic head 1 available at the grid 10 of device 3 because of the jumper between pins 2 and 8 of plug 8, is amplified by the left hand triode portion and the amplified version available at anode 26 is coupled by means of condenser 35 to the grid of the right hand triode portion. The further amplified output available at 27 is coupled by means of condenser 36 and the volume control resistance 37 to the grid 38 of device 4. The amplified output available at 28 is then coupled by condenser 39 and the jumper between pins 5 and 6 of plug 8 to the grid 40 of the power amplifier stage comprising device 5. The amplified output available across 33 is coupled by means of transformer 34 to the loudspeaker 6. The circuit arrangement, thus disclosed, is capable of magnetic reproduction. In a preferred arrangement, the amplifier, magnetic head, tape and tape driving mechanism are constructed as a single transportable unit mounted in a carrying case with the socket 7 mounted in an accessible position.

Figure 2B:
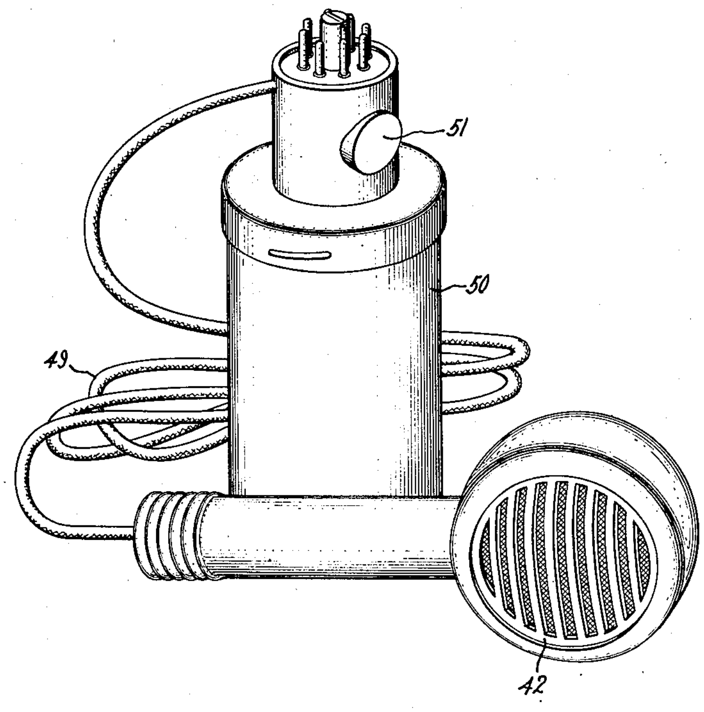

If it is desired to record a message on the tape, a recording adaptor 41, such as is shown in Fig. 2*b*, is employed. This adaptor, when inserted into the socket 7, simultaneously performs all the switching necessary to effect recording with the common head 1. In magnetic recording, it is customary to apply a source of high frequency waves together with the signals to be recorded to the magnetic head in order to act as a magnetic bias thereby minimizing distortion and, hence, permitting more faithful recording of the signals. A high frequency oscillator is usually employed as a source of this magnetic bias.

Since, in any particular mass advertising or industrial application, many magnetic reproducers, such as have been disclosed as comprising a single, compact unit, would be employed, it is desirable to restrict the reproducers to as few components as possible in order to reduce costs. Since a single microphone may be employed to record messages in conjunction with a plurality of such reproducer units when converted for recording, it is desirable to provide the microphone as a separate plug-in unit and to include all the additional recording components in this unit or recording adaptor. Accordingly, the erasing component, the high frequency oscillator and the microphone are combined into a single plug-in unit, as shown in Fig. 2*b*. Fig. 2*a* shows the circuitry of this recording adaptor 41 and the connections available at the plug 9 which cooperates with sockets 7 when it is desired to record. The microphone 42 is coupled between pins 1 and 8 of plug 9. The high frequency oscillator, of the Hartley type, comprises an electron discharge device 43 having the frequency determining circuit comprising inductance 44 and capacitance 45. Filament voltage for device 43 is to be applied between pins 3 and 4 of plug 9. The oscillator output from the anode 46 is coupled by means of condenser 47 to pin 2. Thus, the high frequency bias waves may be obtained from between pins 2 and 1 of plug 9. Anode voltage for device 43 is to be applied to pin 7, which is connected to a tap on the inductance 44. A resistor 48, whose function will be disclosed shortly, is connected between pins 2 and 5 of plug 9.

Referring to Fig. 2*b*, the microphone 42 is separated from the major portion of the adaptor unit by a length of shielded cable 49 to permit maneuverability while recording. The remaining portion of the adaptor is confined in a single case 50 containing the plug 9 at one end, as evidenced by the protruding pins. An erase magnet 51 is mounted on the case in such a position that when the plug 9 is inserted into the socket 7, the erase magnet 51 is brought into intimate magnetic coupling with the portion of the tape feeding toward the magnetic head. Thus, as the tape travels past the erase magnet 51, any stored information is erased before coming into magnetic coupling with the magnetic head being employed for recording purposes.

Upon plugging plug 9 into socket 7, the microphone 42 is connected between the grid 10 of device 3 and the bus 13 by means of pins 8 and 1 respectively. Thus, device 3 now acts as an amplifier for the microphone output for recording in the same manner as when amplifying the magnetic head output for playback. Magnetic head 1, connected at its lowest lead to bus 13, is now connected by means of resistor 48 in the adaptor 41 to condenser 39 and, hence, the anode 28 of device 4 by means of pin 5 of the plug 9. The filament leads of oscillator device 43 are connected in series with the filaments of the remaining devices by means of pins 3 and 4 of the plug 9, and unidirectional potential for device 43 is made available from point 25 by means of pin 7 in the plug. Thus, the magnetic head 1 is fed the proper amount of magnetic bias energy through condenser 47 simultaneously with the amplified microphone output signal energy from condenser 39 through resistor 48. The microphone output amplified by devices 3 and 4 is thus superimposed on the high frequency bias waves in the magnetic head. Since the magnetic head is magnetically linked with the tape, a recording of the microphone output on the tape is achieved.

In a preferred embodiment, the oscillator device 43 comprises a 6AK6 type device having small filament resistance such that insertion of this additional resistance into the filament chain of devices 3, 4 and 5 causes no substantial filament current change to affect operation of the devices.

It should be noted that inserting recording plug 9 into socket 7 removes the anode voltage to device 5, since pin 9 of plug 9 is not connected to pin 7. Thus, no audible output from the speaker is possible to interfere with the microphone pickup. Also, this load on the filtered supply is relieved as the oscillator load is applied. Also, the input grid 40 of device 5 is disconnected from the output of device 4 because pin 5 of plug 9 now connects the magnetic head to the output available from condenser 39 through the resistance 48 in the adaptor 41. Thus, the power amplifier and speaker are completely disabled while the recording function takes place. The disabling of device 5 is permissible, since sufficient gain is available from the use of the amplifying stages comprising devices 3 and 4 during recording. By the use of different circuits for recording and reproducing, that is, by including or excluding the device 5 in the amplifying arrangement, different frequency responses for recording and reproducing are obtained. Thus, during recording, the higher frequencies can be emphasized. During playback, the higher frequencies are de-emphasized and also the high frequency tape and tube noises, thus resulting in a more desirable overall response.

Modifications of this invention will occur to those skilled in the art and it is desired to be understood, therefore, that this invention is not to be limited to the particular embodiments disclosed, but that the appended claims are meant to cover all the modifications which are within the spirit and scope of this invention.

What I claim as new and desire to secure by Letters Patent of the United States is:

1. A magnetic transducing arrangement comprising two detached units, one of said units comprising an audio amplifier, said amplifier comprising input and output terminations, a magnetic head, and an outlet comprising separate connections to said amplifier input and output terminations and said head, said second unit comprising a microphone, a high frequency oscillator, and an outlet comprising separate connections to said microphone and said oscillator, means for simultaneously connecting said magnetic head to said output terminations and said oscillator, and said microphone to said input terminations comprising means supportingly attaching said last named outlet to said first named outlet.

2. A magnetic recording and reproducing arrangement comprising three detached units, one of said units comprising an audio amplifier having an input and an output termination, a loudspeaker, and a magnetic head, means for attaching the second unit to said first unit for connecting said loudspeaker to said output termination and said head to said input termination, the third unit comprising a microphone and a high frequency oscillator, and means for attaching said third unit in place of said second unit to said first unit for connecting said microphone to said input termination and said magnetic head to said output termination and to said high frequency oscillator.

3. A magnetic recording and reproducing arrangement comprising three detached units, one of said units comprising an audio amplifier, having input and output terminations, a loudspeaker, a magnetic head, and an outlet comprising separate connections to said amplifier input and output terminations, said loudspeaker, and to said head, said second unit comprising circuit connections, an outlet for said second unit connections, means for attaching said outlets to one another to connect said head to said input terminations and said loudspeaker to said output terminations, said third unit comprising a microphone, a high frequency oscillator, and an outlet comprising connections to said oscillator and said microphone, means for attaching said third unit outlet to said one unit outlet in place of said second unit outlet to connect said microphone to said input terminations, and said head to said output terminations and said oscillator.

4. An adaptor for cooperation with an electrical apparatus comprising a high frequency oscillator, a microphone, a rigid housing enclosing said oscillator and comprising an assembly for supportingly attaching said housing to said apparatus, said assembly comprising electrical connections to said oscillator and said microphone and arranged electrically to connect said microphone and oscillator to said apparatus upon attachment thereto.

5. A magnetic transducing arrangement comprising two detachable units, one of said units comprising an audio amplifier, said amplifier comprising electron discharge devices, input and output terminations for said amplifier, a source of unidirection potential for said devices, a source of filament potential for said devices, a magnetic transducing head, an outlet comprising connections to said sources, said terminations and said head, said second unit comprising a microphone, and a high frequency oscillator, said oscillator comprising an electron discharge device, filament and anode potential terminals for said device, oscillator output terminations, an outlet comprising connections to said oscillator output terminations, said filament and anode potential terminals and said microphone, means for rigidly attaching said outlets together to connect said unidirectional source to said anode terminal, said filament source to said filament terminals, said microphone to said amplifier input terminations, and said magnetic head to said amplifier output terminations and said oscillator output terminations.

6. A magnetic transducing apparatus comprising a recording adaptor which is detachable from the apparatus, said apparatus comprising a recording medium, a magnetic transducing head magnetically coupled to said medium in signal transfer relation, an amplifier comprising input and output terminations, said adaptor comprising an oscillator, a microphone, an erase magnet, said adaptor upon attachment to said apparatus connecting said microphone to said input terminations, said head to said output terminations and said oscillator, and magnetically coupling said magnet with said medium for erasing purposes.

7. In combination a first unit comprising an amplifier having input and output terminals, a magnetic record medium, and a first outlet comprising electrical connections to said input and output terminals, said medium and said power amplifier stage, a second unit comprising a source of oscillations, a magnetic erasing element, a microphone, and a second outlet comprising electrical connections to said microphone and source, means for simultaneously electrically connecting said source and medium to said output terminals, said microphone to said input terminals, and magnetically coupling said erasing element to said medium comprising means for supportingly attaching said second outlet to said first outlet.

8. In combination, a first unit comprising an amplifier to be selectively operated for recording or reproducing purposes, said unit further comprising reproducing apparatus normally disconnected from said amplifier, an outlet comprising connections to said amplifier, and said reproducing apparatus, a second unit comprising a plurality of electrical circuits, and a second outlet comprising electrical connections to said circuits, a third unit comprising a recording input circuit, a recording high frequency bias signal generator, and a third outlet comprising electrical connections to said recording input circuit and said generator, means for selectively operating said amplifier for reproducing purposes comprising means for supportingly attaching said second outlet to said first outlet to connect said reproducing apparatus to said amplifier through said second unit circuits, means for selectively operating said amplifier for recording purposes comprising means for supportingly attaching said third outlet to said first outlet in place of said second outlet to connect said recording input circuit and said generator to said amplifier.

9. In combination, a first unit comprising an amplifier to be selectively operated for recording or reproducing purposes, said unit further comprising a record medium and a reproducing output circuit normally disconnected from said amplifier, an outlet comprising connections to said amplifier, said medium and said reproducing output circuits, a second unit comprising a plurality of electrical circuits, and a second outlet comprising electrical connections to said circuits, a third unit comprising a recording input circuit, a recording high frequency bias signal generator, and a third outlet comprising electrical connections to said recording input circuit and said generator, means for selectively operating said amplifier for reproducing purposes comprising means for supportingly attaching said second outlet to said first outlet to connect said medium and said reproducing output circuit through said second unit circuits to said amplifier, means for selectively operating said amplifier for recording purposes comprising means for supportingly attaching said third outlet to said first outlet in place of said second outlet to connect said recording input circuit, said generator and said medium to said amplifier.

10. In combination, a first unit comprising an amplifier having input and output terminals, a power supply, said amplifier comprising electron discharge devices, a magnetic record medium, and a first outlet comprising electrical connections to said input and output terminals, said devices, said supply and said medium, a second unit comprising a normally inoperative generator of oscillations, a signal source, a magnetic erasing element, and a second outlet comprising electrical connections to said signal source, said erasing element and said generator, means for simultaneously connecting said medium to said output terminals, said source to said input terminals, said supply to said devices, said supply to said generator to render said generator operative and magnetically coupling said erasing element to said medium comprising means for supportedly attaching said second outlet to said first outlet.

11. In combination, a first unit comprising an amplifier having input and output terminals, a power supply, said amplifier comprising electron discharge devices which are normally disconnected from said supply, a record medium, and a first outlet comprising electrical connections to said input and output terminals, said devices, said supply and said medium, a second unit comprising a generator of oscillations which is normally inoperative, a signal source, and a second outlet comprising electrical connections to said signal source and said generator, means for simultaneously connecting said medium to said output terminals, said source to said input terminals, said supply to said devices, and said supply to said generator to render said generator operative comprising means for supportingly attaching said second outlet to said first outlet.

JAMES B. SHICKEL.

REFERENCES CITED

The following references are of record in the file of this patent:

UNITED STATES PATENTS

| Number | Name | Date |
|---|---|---|
| 1,142,384 | Tiffany | June 8, 1915 |
| 1,844,583 | Leishman | Feb. 9, 1932 |
| 2,305,626 | Lee | Dec. 22, 1942 |
| 2,321,370 | Dubilier | June 8, 1943 |
| 2,563,545 | Moreland | Aug. 7, 1951 |